United States Patent [19]

Lee

[11] Patent Number: 5,001,577
[45] Date of Patent: Mar. 19, 1991

[54] DOCUMENT READING APPARATUS FOR USE IN A FACSIMILE SYSTEM

[75] Inventor: Byeong-Joo Lee, Seoul, Rep. of Korea

[73] Assignee: SamSung Electronics Co., Ltd., Suweon City, Rep. of Korea

[21] Appl. No.: 408,546

[22] Filed: Sep. 18, 1989

[30] Foreign Application Priority Data

Feb. 28, 1989 [KR] Rep. of Korea ............... 1989-2242

[51] Int. Cl.$^5$ ............................................. H04N 1/04
[52] U.S. Cl. ...................................... 358/498; 358/474
[58] Field of Search ............... 358/400, 401, 408, 474, 358/486, 487, 491, 492, 494, 496, 497, 498

[56] References Cited

U.S. PATENT DOCUMENTS 4,806,775  2/1989  Uchida .......................... 358/496

FOREIGN PATENT DOCUMENTS 0043258  2/1987  Japan .
0154947  7/1987  Japan .
0154948  7/1987  Japan .
0166648  7/1987  Japan .
0314952  12/1988  Japan .
0314964  12/1988  Japan .
0012668  1/1989  Japan .

Primary Examiner—Edward L. Coles, Sr.
Assistant Examiner—Jerome Grant, II
Attorney, Agent, or Firm—Robert E. Bushnell

[57] ABSTRACT

There is disclosed a document reading apparatus for use in a facsimile system capable of always keeping the surface of a reading base plate, mounted on the top surface of a document conveying device, clean so that the quality of an image signal read out from a document is highly improved. The improved device is achieved by preventing said reading base plate from making direct contact with a document being conveyed, so that a light beam irradiated from a light source can be properly and efficiently reflected. The inventive subject including a light source 1, reflectors 3 and 3', a lens 4, and a light-electricity converting means 5 includes a reading base surface which is protruded a little more than a reading base plate and protrusion means which is formed in proximity to a document inlet.

11 Claims, 3 Drawing Sheets

DOCUMENT READING APPARATUS FOR USE IN A FACSIMILE SYSTEM

BACKGROUND OF THE INVENTION

The present invention relates to a document reading apparatus for use in a facsimile system capable of keeping the surface of a reading base plate, mounted on the top surface of a document conveying device, always clean so that the quality of an image signal read out from a document is highly improved.

Heretofore, as shown in FIG. 1, a light beam from a light source 1 irradiates to a reading base surface 2' of reading base plate 2 and then a reflected light therefrom is reflected again by reflectors 3, 3' to a light-electricity converting element 5. Said reflected light is read out by the light-electricity converting element 5 through a lens 4 and recorded to a memory device (not shown). Then, the image data of the document conveyed according to the operation of a driving roller 6 is read out by the light-electricity converting element 5 in the same operation as abovementioned, and converted to an electric signal to be transmitted to an external device.

However, since the conventional document reading device, as aforementioned, of which reading base plate 2 is formed with a plane surface, is located at a position so as to contact the document 7 thereto conveyed by the driving roller 6, there is a disadvantage in that the reading base surface 2' becomes contaminated by dust stuck on the document.

Accordingly, when the reading base plate is contaminated, the reflecting rate of the light irradiated from the light source is lowered. However, when any difference occurs in to the light reflecting rate between the reading base plate and the document, an undesirable blotted image is produced on the received recording paper, so that a document with a clear image can not be obtained.

OBJECT OF THE INVENTION

It is an object of the present invention to provide a document reading apparatus capable of keeping the surface of a reading base plate always clean by preventing direct contact of the reading base plate with a document being conveyed, this allows light beam irradiated from a light source to be properly, and efficiently reflected.

According to one aspect of the invention, the document reading apparatus including a light source, reflectors, a lens, and a light-electricity converting means comprises a reading base surface which protrudes a little more than a reading base plate and a protrusion means which is formed in proximity to a document inlet.

According to another aspect of the invention to achieve the objects and effects abovementioned, a shape of said protrusion means can be formed by a protrusion such that its one side is perpendicular to the reading base plate and another side is gradually sloped toward the document inlet. The shape of said protrusion means may be further formed by protruding its top so as to be flat and having sloped portions at both sides. In addition, said reading base surface may be formed in a concaved recess type. Two respective protrusion means may also be formed on both sides of the reading base surface.

BRIEF DESCRIPTION OF THE DRAWINGS

For a better understanding of the invention, and to show how the same may be carried out into effect, reference will now be made, by way of example, to the accompanying drawings, in which.

DETAILED DESCRIPTION OF THE INVENTION

A preferred embodiment of the present invention will be described in detail with reference to the accompanying drawings hereinafter.

Figure 1:
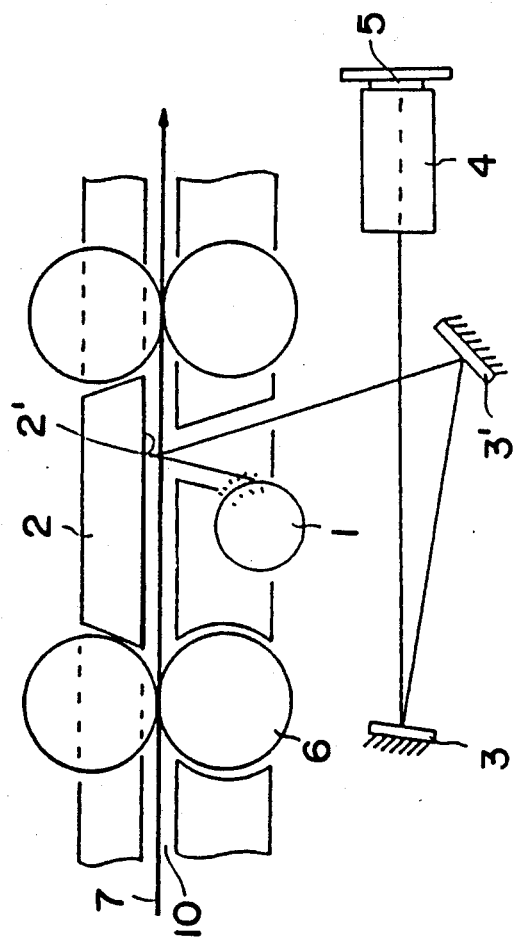
FIG. 1 is a schematic diagram for illustrating the structure of a document reading device of a conventional facsimile.
Figure 2:
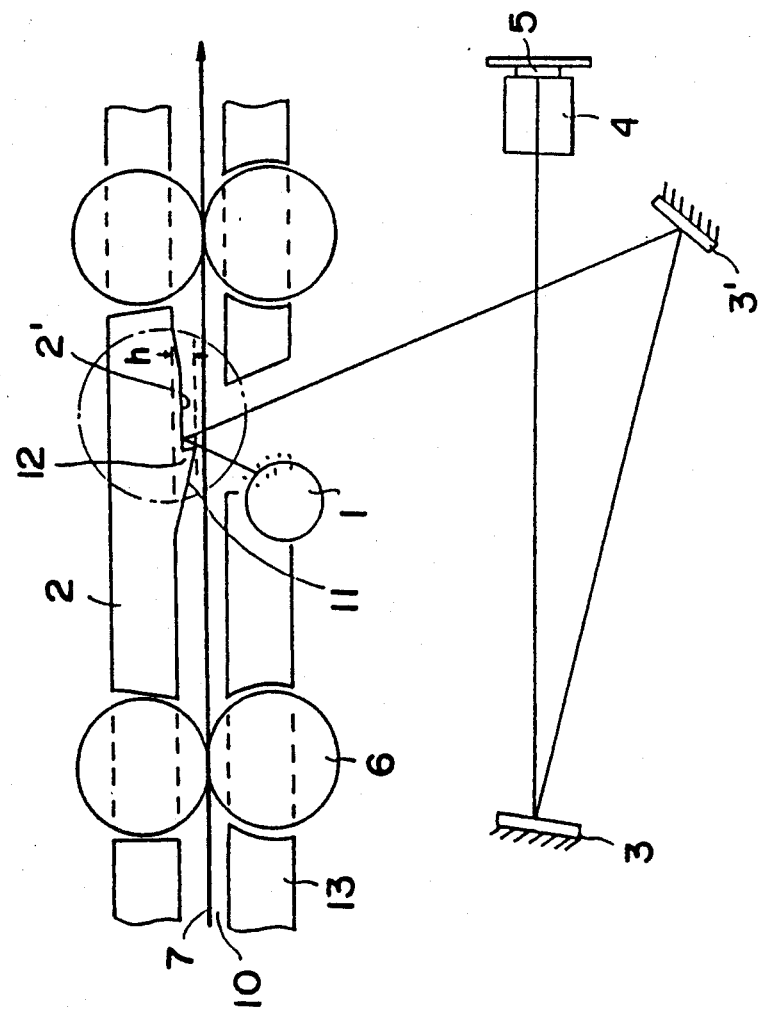
FIG. 2 is a schematic diagram for illustrating the structure of a document reading device of a facsimile according to the present invention.

Referring to FIG. 2, a protrusion means 11 is formed in proximity of the document inlet means 10 to a reading base plate 2 for reflecting the light irradiated from the light source 1, in which said protrusion means 11 is constructed so as to be inclined toward the proceeding direction of the document.

The operation and effect of the present invention constructed as above will be explained in detail hereinafter. Since when the document is conveyed by the driving roller 6 from the document inlet 10, said document proceeds under the situation that the lower supporting plate 13 contacts the document by a slope means 12 placed beside the reading base surface by 2', and the document proceeds in a state of being apart from the reading base surface as much as a height "h" of the protrusion means 11. Accordingly, since the reading base surface 2' is apart from the contaminates such as dirt stuck on the document 7, the reading base surface 2' can always be maintained in a clean state so that the light irradiated from the light source 1 will be correctly reflected, outputted to the light-electricity converting element 5 and stored into a memory device, so that the image of the document can be correctly transmitted and thereby the picture quality of the received document can keep an excellent state.

Figure 3A:
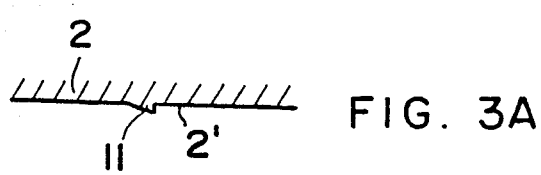
FIGS. 3A to 3D are schematic diagrams of magnified fragmentary sectional view of the reading base surface according to the present invention.
Figure 3B:
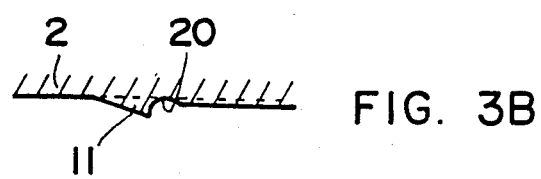
Figure 3C:
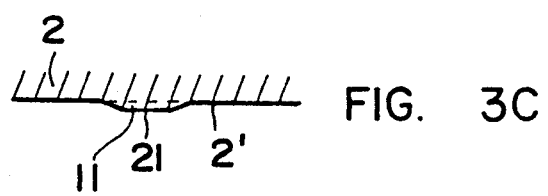
Figure 3D:
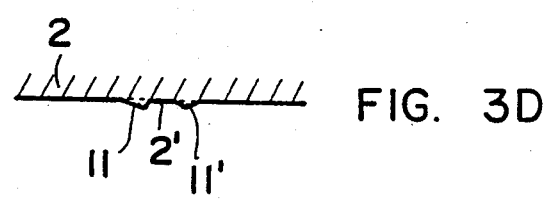

In the above description, though the protrusion means 11 is formed perpendicularly to the reading base surface 2' and formed to be inclined toward the document inlet 10, such protection means for the reading base surface 11 can be formed as shown in FIG. 3B, such that one side of the reading base surface 2' of the reading base plate 2 is to be inclined toward the document inlet 10 and another side of the reading base surface 2' can be provided to form a recess 20 as in FIG. 3B, more concaved than the reading base plate. Further as shown in FIG. 3C, it may be formed such that a top portion 21 of the protrusion means 11 is formed with a slightly flat plane and sloped gradually toward both ends. Moreover, as shown in FIG. 3D, by means of two respective protrusions (11, 11') having reading base surface 2' at its both sides, the reading base surface 2' is apart from the document, so that the reading base surface can always be cleanly maintained. Therefore, an advantage of the invention is that the quality of the transmitted image can be enhanced.

It will be appreciated that the present invention is not restricted to the particular embodiment that has been described hereinbefore, and that variations and modifications may be made therein without departing from the spirit and scope of the invention as defined in the appended claims and equivalents thereof.

What is claimed is:

1. A document reading apparatus, comprising:
a light source providing a light beam;
means for converting said light beam into an electrical signal;
a reading base plate providing a reading base surface irradiated by said light beam; and
protrusion means formed on said reading base plate as a integral member of said reading base plate adjoining said reading base surface and disposed in proximity to a document inlet, for maintaining a fixed minimum separation between said reading base surface and a document at a location where the document and said reading base surface are irradiated by the light beam.

2. An apparatus according to claim 1, wherein said protrusion means is formed with a first side perpendicular to the reading base plate and a second side forming an apex with said first side and gradually sloped away from said apex and toward the read base surface and the document inlet.

3. An apparatus according to claim 1, wherein said protrusion means is formed with a flat plane having sloped portions at either side.

4. An apparatus according to claim 2, wherein said reading base surface is formed with said first side including a concave recess.

5. An apparatus according to claim 1, wherein said protrusion means comprises two sloped surfaces formed on opposite sides of said reading base surface.

6. A document reading apparatus, comprising:
a reading base plate providing a generally planar surface;
means for conveying a document past said reading base plate and a source of electromagnetic radiation positions opposite from said reading base plate for illuminating a region of said reading base plate;
a reading base surface formed within said region spaced apart from said generally planar surface and disposable between said conveying means and opposite from the source to receive the electromagnetic radiation; and
a fixed protrusion disposed within said region and adjoining said reading base surface, formed on said reading base plate as an integral element of said reading base plate and reading base surface, in proximity to a document inlet, maintaining an apex at a fixed distance along a normal to said generally planar surface, from said generally planar surface and said reading base surface, wherein said reading base surface is at a lesser distance from said generally planar surface than said fixed distance, whereby a document passing between said reading base surface and source of electromagnetic radiation is held apart from said reading base surface by said protrusion.

7. An apparatus according to claim 6, wherein said protrusion includes a first side extending perpendicularly to the reading base plate and a second side gradually sloped from said first side and toward the document inlet.

8. An apparatus according to claim 6, wherein said protrusion includes spaced apart portions having oppositely directed sloped surfaces spaced apart on opposite sides of said reading base surface.

9. An apparatus according to claim 6, wherein said protrusion is formed with a sloped first side and said reading base surface is formed with a concave recess adjoining said sloped first side.

10. An apparatus according to claim 6, wherein said protrusion is formed with two oppositely directed sloped sides disposed on either side of said reading base surface.

11. A method of reading a document in a facsimile system, comprising the steps of:
conveying a document through a document inlet of said facsimile system and along a surface of a base within the facsimile system;
irradiating light energy towards the surface and the document;
conveying the document past said surface within said facsimile system while maintaining a fixed protrusion between said surface and document where said surface and document are irradiated with said light and thereby providing a minimum separation between said surface an the document where said surface and document are irradiated with said light energy;
reflecting the light energy from the document; and
converting the reflected light energy into data.

* * * * *